United States Patent [19]
Fisher et al.

[11] Patent Number: 5,947,533
[45] Date of Patent: *Sep. 7, 1999

[54] GASKET ASSEMBLY WITH ELASTOMER EXPANSION AREA

[76] Inventors: Ronald K. Fisher, 3575 Work Rd., Ravenna, Ohio 44266; Gerald A. Babuder, 8807 Yorkwood Ct., Mentor, Ohio 44060

[ * ] Notice: This patent issued on a continued prosecution application filed under 37 CFR 1.53(d), and is subject to the twenty year patent term provisions of 35 U.S.C. 154(a)(2).

[21] Appl. No.: 08/692,006

[22] Filed: Aug. 2, 1996

[51] Int. Cl.$^6$ ..................................... F16L 19/06
[52] U.S. Cl. ...................... 285/350; 285/336; 285/364; 277/614
[58] Field of Search ..................... 285/350, 336, 285/364, 349, 365, 363; 277/614

[56] References Cited

U.S. PATENT DOCUMENTS

| | | |
|---|---|---|
| Re. 34,144 | 12/1992 | Leigh . |
| 144,997 | 11/1873 | Mayall . |
| 442,947 | 12/1890 | Bowers . |
| 1,137,113 | 4/1915 | Bouchard . |
| 1,819,036 | 8/1931 | Oberhuber ............................. 277/614 |
| 1,873,855 | 8/1932 | Wilson . |
| 2,070,291 | 2/1937 | McHugh . |
| 2,178,819 | 11/1939 | Timm . |
| 2,291,709 | 8/1942 | Goetze . |
| 2,342,422 | 2/1944 | Morehead et al. . |
| 2,417,025 | 3/1947 | Volpin . |
| 2,552,750 | 5/1951 | Thornhill . |
| 2,780,483 | 2/1957 | Kessler . |
| 2,789,844 | 4/1957 | Kessler . |
| 3,042,430 | 7/1962 | Guy . |
| 3,078,110 | 2/1963 | Starr . |
| 3,100,656 | 8/1963 | MacArthur .............................. 285/350 |

(List continued on next page.)

FOREIGN PATENT DOCUMENTS

| | | |
|---|---|---|
| 707239 | 4/1965 | Canada .................................. 285/336 |
| 0327714A2 | 12/1988 | European Pat. Off. . |
| 499 090 | 8/1926 | Germany . |
| 731042 | 1/1943 | Germany . |
| 947034 | 7/1956 | Germany . |
| 3542523 | 7/1987 | Germany . |
| 8800117 | 4/1988 | Germany . |
| 3741782 | 6/1989 | Germany ............................... 285/336 |
| 38 05885 | 9/1989 | Germany . |
| 4140814 | 6/1993 | Germany ............................... 285/336 |
| 4201535 | 7/1993 | Germany ............................... 285/336 |
| 1962745 U | 6/1997 | Germany . |
| 280783 | 7/1962 | Netherlands . |
| 674-764-A | 7/1990 | Switzerland . |
| 798650 | 7/1958 | United Kingdom . |
| WO 89/03495 | 4/1989 | WIPO . |

*Primary Examiner*—Eric K. Nicholson
*Attorney, Agent, or Firm*—Calfee, Halter & Griswold LLP

[57] ABSTRACT

A pipe joint assembly comprises a pair of cylindrical pipe ends of the same internal diameter in axially contiguous aligned relationship. Connecting flanges extend radially outward of each of the pipe end and have opposed faces defining a circumferentially continuous packing groove including a first axially narrow portion opening to the cylindrical interior of the pipe ends and a second axially wider portion radially outward of the first portion. An elastomeric gasket positioned in the packing groove. The gasket is sized and dimensioned to completely fill the first axially narrow portion and extend to within the second portion. The radial inner extent of the gasket provides a smooth continuation of the cylindrical interior surfaces of said pipe ends when the flange faces are at their limit of movement toward one another. The second portion of the packing groove is sufficiently large to provide expansion space into which the gasket can expand when subjected to temperature increases to thereby reduce extrusion of the gasket beyond the cylindrical interior surfaces of the pipe ends.

20 Claims, 3 Drawing Sheets

U.S. PATENT DOCUMENTS

| | | |
|---|---|---|
| 3,180,650 | 4/1965 | Liebig . |
| 3,189,371 | 6/1965 | Swan . |
| 3,195,906 | 7/1965 | Moyers . |
| 3,201,725 | 8/1965 | Johnson . |
| 3,215,442 | 11/1965 | Papenguth . |
| 3,298,719 | 1/1967 | Bills et al. ............................... 285/336 |
| 3,302,953 | 2/1967 | Glasgow . |
| 3,387,867 | 6/1968 | Rogers . |
| 3,484,912 | 12/1969 | Crain . |
| 3,600,770 | 8/1971 | Halling . |
| 3,669,474 | 6/1972 | Bode . |
| 3,705,737 | 12/1972 | Westerlund et al. . |
| 3,727,926 | 4/1973 | Berry . |
| 3,747,963 | 7/1973 | Shivak ..................................... 285/336 |
| 3,775,832 | 12/1973 | Werra . |
| 3,797,079 | 3/1974 | Nixon . |
| 3,819,211 | 6/1974 | Knox . |
| 3,820,830 | 6/1974 | Dryer . |
| 3,873,102 | 3/1975 | Lotze et al. . |
| 3,966,240 | 6/1976 | Enomoto . |
| 3,989,285 | 11/1976 | Yancey . |
| 4,123,095 | 10/1978 | Stehlin . |
| 4,341,406 | 7/1982 | Abbes et al. . |
| 4,362,327 | 12/1982 | Mieth . |
| 4,362,449 | 12/1982 | Hlinsky . |
| 4,568,115 | 2/1986 | Zimmerly . |
| 4,627,646 | 12/1986 | Kessel . |
| 4,653,725 | 3/1987 | Nanz et al. ............................. 285/336 |
| 4,735,445 | 4/1988 | Maier . |
| 4,779,903 | 10/1988 | Maier et al. . |
| 4,812,285 | 3/1989 | Stapleton . |
| 4,836,583 | 6/1989 | Maier et al. . |
| 4,872,712 | 10/1989 | Maier . |
| 4,915,418 | 4/1990 | Palatchy . |
| 4,919,453 | 4/1990 | Halling et al. . |
| 5,076,617 | 12/1991 | Bronnert . |
| 5,090,871 | 2/1992 | Story et al. . |
| 5,196,814 | 3/1993 | Felker ..................................... 285/336 |
| 5,222,747 | 6/1993 | McGarvey . |
| 5,251,941 | 10/1993 | McGarvey . |
| 5,366,261 | 11/1994 | Ohmi et al. ............................. 277/614 |
| 5,433,454 | 7/1995 | Ramberg ................................. 285/336 |
| 5,505,464 | 4/1996 | McGarvey . |
| 5,566,983 | 10/1996 | Gluys et al. . | ns
GASKET ASSEMBLY WITH ELASTOMER EXPANSION AREA

BACKGROUND OF THE INVENTION

The subject invention is directed toward the art of pipe joints and couplings and, more particularly, to a flange-type pipe joint incorporating an improved relationship between the flanges and an associated gasket.

Flange-type pipe joints having elastomeric gaskets sealingly clamped between opposed flange end faces are frequently used in processing systems wherein fluid entrapment is highly undesirable. To reduce the likelihood of fluid entrapment, it is known to design the gasket and associated flanges such that when the joint is made up, the radially inner face of the gasket forms a smooth continuation between the interior surfaces of the connected pipes. Joints of this general type are shown, for example, in U.S. Pat. Nos. 3,775,832, 4,735,445, and German Patentschrifts CH 674764 A5 and 947,034.

The prior art has proposed various methods or designs to assure that over or under compression of the gaskets can not occur. In spite of this, the inventors of the subject invention have found that with many elastomeric gasket materials, repetitive temperature cycling can produce permanent extrusion of the inner periphery of the gasket into the flow path over a period of time. Even a slight extrusion can result in retention of substantial fluid in the pipe line. This can be a significant and often unrecognized problem in systems requiring high degrees of cleanliness and/or ease of flushing and changeover between different process fluids.

SUMMARY OF THE INVENTION

The subject invention provides a pipe joint construction of the type discussed above that is designed to eliminate or greatly reduce the possibility of gasket extrusion.

In particular, and in accordance with the subject invention, a pipe joint of the general type discussed above includes a pair of cylindrical pipe ends in axially contiguous relationship with the pipe ends having cylindrical interior surfaces of the same diameter in aligned relationship. The connecting flanges extend radially outward of each of the pipe ends and include opposed faces defining a circumferentially continuous packing groove including a first axially narrow portion opening to the cylindrical interior surfaces and a second axially wider portion radially outward of the first portion. Rigid means are associated with the flanges to limit movement of the flanges axially toward one another. Positioned in the packing groove is an elastomeric gasket that is sized and dimensioned to completely fill the radially innermost portion of the first axially narrow portion. The radial inner extent of the gasket is sized and shaped to provide a smooth continuation of the cylindrical interior surfaces of the pipe ends when the flange faces are at their limit of movement toward one another. The second portion of the packing groove is sufficiently large to provide expansion space into which the gasket can expand when subjected to temperature increases to thereby reduce extrusion of the gasket beyond the cylindrical interior surfaces of the pipe ends.

Preferably, and in accordance with a more limited aspect of the invention, the rigid means include surface portions carried on the opposed faces of the connecting flanges to prevent movement of the flanges toward one another beyond a predetermined minimum point.

In accordance with a still further aspect of the invention, the first axially narrow portion of the packing groove is defined by axially spaced and radially extending sections of the opposed faces of the connecting flanges with the axially spaced and radially extending sections being substantially planar.

In one preferred form of the invention, the axially spaced and radially extending sections that define the narrow portion are positioned relative to one another to cause movement in a radial outward direction of the gasket material when it is undergoing thermal expansion to further reduce the likelihood of extrusion into the cylindrical interior of the pipe ends.

The invention as described above results from a finding that a high percentage of elastomeric materials used for such gaskets can undergo a permanent expansion as a result of temperature cycling. By providing expansion space adjacent to the narrow inner sealing portion of the gasket there results a significant reduction of expansion into the flow area of the pipe ends. By maintaining the narrow gasket section at a minimum and allowing radial outward expansion space, there is a significant reduction in such undesired extrusion.

As can be seen from the foregoing, a primary object of the invention is the provision of a gasket structure wherein extrusion of the gasket into the fluid flow path is substantially eliminated and a smooth continuation of the inner wall surfaces of the connected pipes is maintained throughout the life of the joint.

Yet another object is the provision of a pipe joint assembly of the general type described wherein it is not possible to over compress the gasket or to produce extrusion of the gasket material into the flow path.

Yet another object of the invention is the provision of a flange-type joint of the type described wherein the gaskets can include means to provide a fixed metal-to-metal limit on movement of the flanges toward one another.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein.

DETAILED DESCRIPTION OF THE PREFERRED EMBODIMENT

Figure 1A:
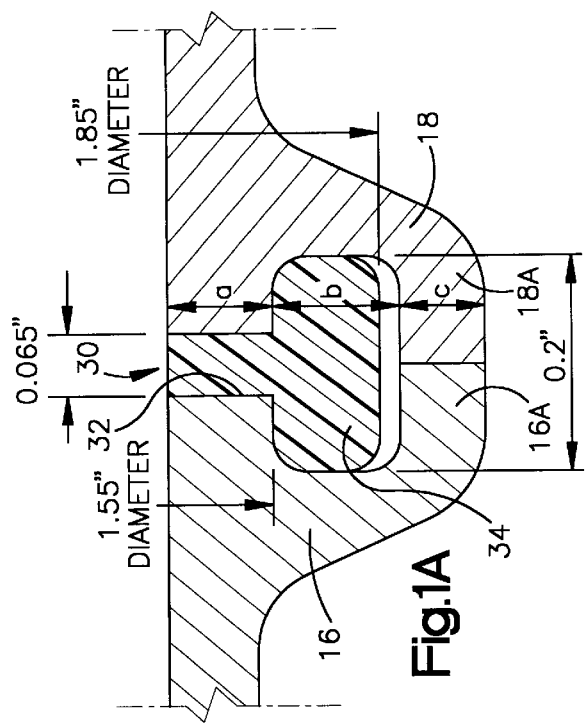
FIG. 1a is a greatly enlarged view of the gasket recess of the made-up joint of FIG. 1 to more fully show the relationships between the gasket and the gasket recess.
Figure 1B:
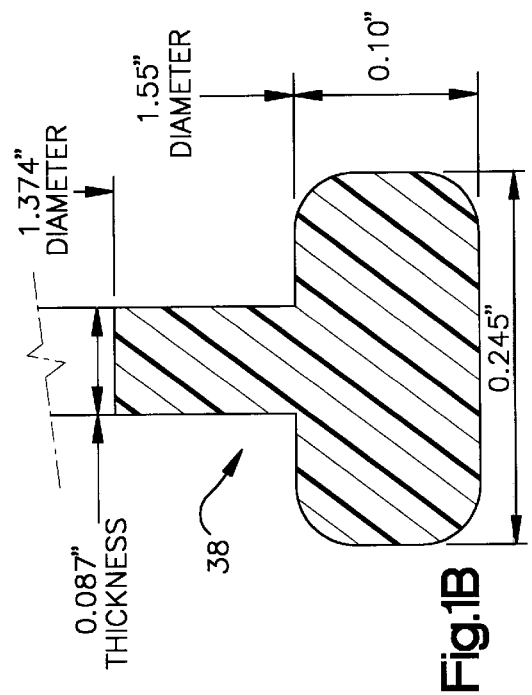
FIG. 1b is a greatly enlarged cross-sectional view through the gasket.
Figure 1:
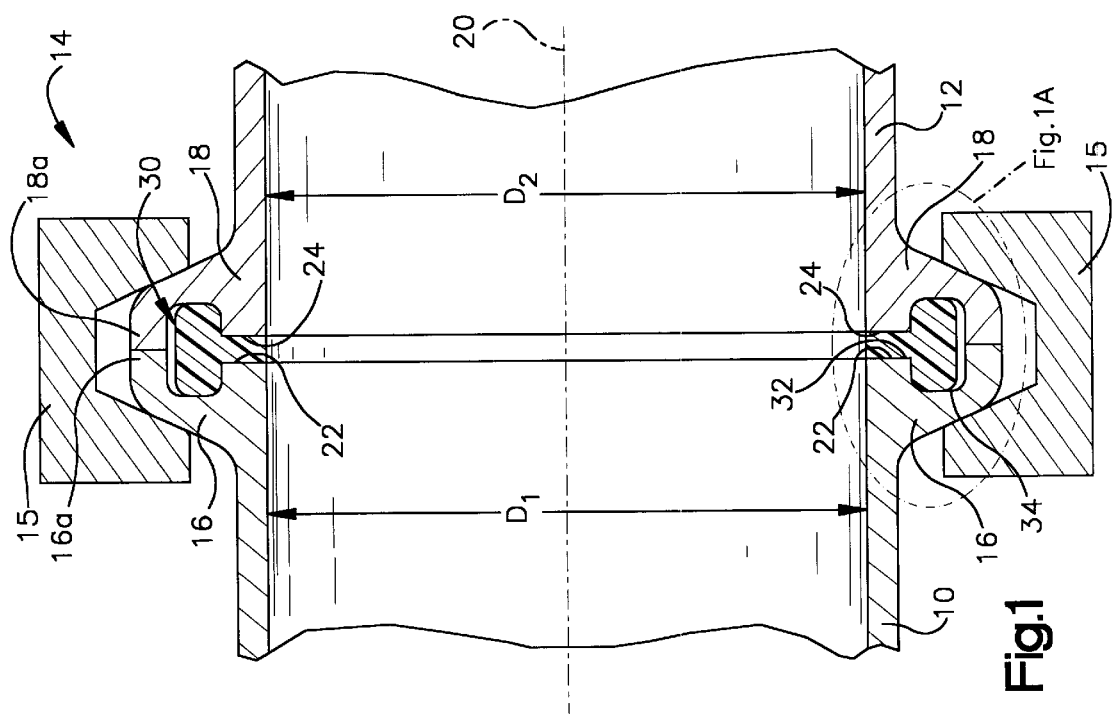
FIG. 1 is a transverse cross-sectional view through a preferred form of pipe joint construction formed in accordance with the subject invention.

Referring now to the drawings wherein the showings are for the purposes of illustrating preferred and alternative embodiments of the invention only and not for purposes of limiting same, FIG. 1 shows, in horizontal cross section, a pair of axially aligned, cylindrical pipe ends 10, 12 which are joined in sealed relationship by a flange-type pipe joint assembly 14. The pipe ends 10, 12 have uniform inner open diameters D1 and D2, respectively, which are of the same diameter and positioned in closely aligned relationship. Circumferentially continuous, radially extending flanges 16, 18, respectively, are formed at the ends of each of the pipe ends 10, 12. The flanges allow the pipe ends to be clamped in the assembled condition shown by a conventional clamp ring 15 illustrated somewhat diagrammatically. Although the flanges 16, 18 could be formed as separate elements and suitably connected to the pipe ends, they are shown in the subject embodiment as being integrally formed on the respective pipe ends 10, 12.

Each of the flanges 16, 18 include a sealing end face that preferably lies in a plane perpendicular to the center axis 20. The end faces 22, 24 of the flanges 16, 18, respectively, cooperate to define a circumferentially continuous packing receiving recess 30. In the subject embodiment, the packing receiving recess or groove 30 is arranged so that when the flanges 16, 18 are clamped into the relationship shown in FIG. 1, the groove 30 has a radial inner first portion 32 which is relatively narrow and opens toward the interior of the central flow passage. The groove 30 further includes a second axially wider portion 34 that is located radially outward of the first portion 32 and is circumferentially continuous thereabout. The control of the width of the packing recess or groove 30 is provided by rigid extensions 16a, 18a on the radial outer edge of the flanges 16, 18, respectively, to limit movement of the flanges axially toward one another.

Positioned within the groove 30 is a gasket 38 formed from a suitable elastomeric material. Many different elastomeric materials could be using including ethylene propylenes, fluorocarbons, silicone rubbers, and tetrafluoroethylenes. In this embodiment, both the groove 30 and the gasket 38 have the generally T-shaped cross section shown. FIG. 1a and 1b illustrate the preferred nominal dimensional relationships for the groove 30 and the gasket 38, respectively. In particular, the seal face of the flange has the general dimensions as shown for tubes having a nominal O.D. of 1.5 inches and an I.D. of 1.37 inches; however, the general relationships are valid for a range of tube sizes. In reviewing these dimensions and comparing the recess dimensions with the gasket dimensions, it will be seen that the narrower inner portion of the seal is compressed in the axial dimension by about 25%, whereas the wider outer portion is compressed about 18%. This, of course, results in significantly higher sealing pressures on the radial inner faces. Additionally, however, it will be seen that the wider portion of the gasket 38 is axially compressed and it is not radially compressed. Rather, substantial space exists radially outward of the gasket. In fact, the open space is a volume that is at least 18% of the minimum volume of the seal. This space is extremely important to the invention as explained more fully hereafter.

The general preferred design guidelines for the seal under consideration are as follows (these figures are believed valid for a range of tube and flange sizes):

1. The radial dimensions a, b, and c should respectively constitute about 30%, 50%, and 20G of the total radial dimension of the flange;

2. The inner, narrow seal portion (radial dimension a) should preferably be compressed about 25% and the outer seal portion should be compressed about 18%; and, 3. The ratio of the groove 30 outside diameter to the gasket outside diameter should be greater than 1.05.

As previously discussed, it has been found that with gaskets formed of elastomeric material and used in environments of the type under consideration, there is a tendency for the gasket to extrude into the flow passage a slight amount which, for example, on a horizontal pipe run, results in small dam-like protuberances which retain fluid and make it more difficult to clean or flush for changeover between different system fluids. In addition, the protuberances reduce the drainability of product and increase flow turbulence and pressure loss. In some biotech applications, the protuberances can even cause damage to the product or living cells contained in the fluid. It has been found through extensive testing that this extrusion results from temperature cycling which, over time, produces a permanent expansion of many elastomeric materials including those noted above. The subject design greatly reduces or eliminates extrusion of the gasket material into the flow path by providing a substantial expansion space radially outward of the inner gasket face so that the expansion, or a significant portion thereof, is more likely to proceed radially outward into the expansion space.

Figure 2:
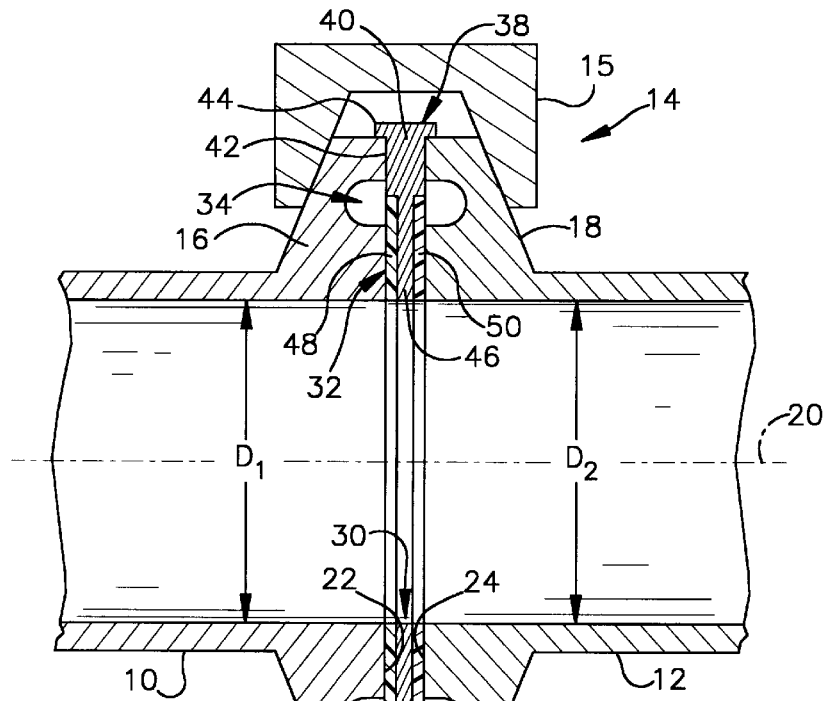
FIG. 2 a cross-sectional view of a modified form of joint in which the gasket includes portions arranged to prevent undesired over compression of the elastomeric seal material.

FIG. 2 illustrates a further embodiment of the invention and uses a substantially different gasket design and modified flanges. In the FIG. 2 embodiment, the gasket 38 is positioned between the end flanges as shown and comprises a circumferentially continuous, rigid metal ring 40 having a relatively thicker outer portion 42 terminating in a circumferential flange 44 that extends axially and is sized so as to be closely received on the outer periphery of the flanges 16, 18. This precisely locates the gasket 38 relative to the flanges and, of course, the central flow passage. When the gasket assembly and flanges are made up as shown in FIG. 2, the flanges engage the portion 42 and limit the axial movement of the flanges toward one another. This, of course, limits the width of the inner gasket groove 30.

The gasket 38 further includes an integral, relatively narrow metal ring portion 46 that extends radially inward and terminates at an inner peripheral face that is sized and located so as to exactly correspond with the inner diameters D1, D2. Suitable elastomeric gasket elements 48, 50 are bonded to opposite side faces of the rigid metal ring portion 46. The material from which these portions are formed could, of course, vary depending upon the fluid intended to be handled by the pipes being joined; but, for example, could comprise any of several well known elastomers, such as those mentioned above. The radial dimension of the gasket portions 48 is sufficient so as to extend from the inner diameters D1, D2 outwardly into the axially wider portion 34 of the groove 30. In addition, it should be appreciated that the axial thickness of these elements is such that when the flange joint assembly 14 is made up by causing the flange faces to engage portion 42 of ring 40, the compression acting to provide the necessary sealing forces between the flange end faces and the gasket assembly is such as to assure a seal and cause the inner radial faces of the elastomeric gasket portions 48, 50 to extend into substantially exact alignment with the radial inner diameters of the pipe ends and the radial inner face of the rigid metal ring portion 46 so that a smooth continuation of the flow diameters D1, D2 is assured across the gasket assembly 30. This totally eliminates any likelihood of the formation of a recess or area in which system fluids can be trapped. In this embodiment, the wider radial outward portion 34 of the groove 30 is located so as to connect directly with the outer portion of the elastomeric members 48, 50 and provide an expansion space. To further enhance this feature, it is sometimes desirable to attempt to force the expansion to a radial outward position such as, for example, by inclining the inner portions of the flange faces that engage the gasket so that even the narrower inner portion 30 is itself tapered and of decreasing axial width toward the interior of the flanges.

Figure 3:
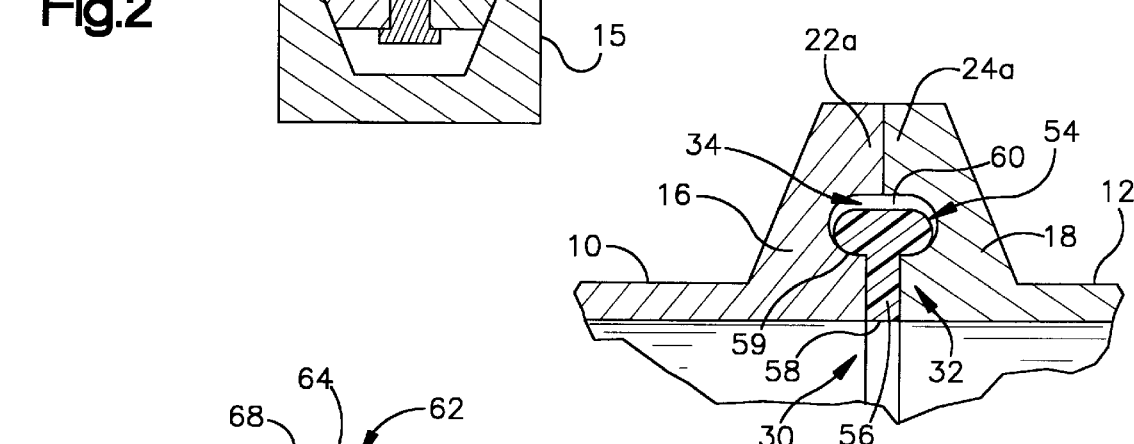
FIGS. 3, 4, and 4a through 7 are partial cross-sectional views of alternative forms of the invention wherein radial location of the gaskets relative to the flanges is achieved simultaneously with movement of the pipe flanges toward one another.

FIG. 3 shows a modified form of the invention which uses a somewhat simpler gasket structure and a slightly modified flange structure. In particular, the flanges 16 and 18 are modified from the FIG. 2 version by having the outer peripheral portion of their end faces formed to extend outwardly relative to the radial inner portions. In particular, the radial outer portions 22a and 24a extend outwardly and act as rigid means to limit the movement of the flanges axially toward one another and to function as controls relative to the compression that can be applied to the gasket member 54. In all other respects, the flanges 16, 18 are identical to those shown in the FIG. 2 embodiment. That is, the end faces define a packing receiving opening or groove 30 that has a radial inner first portion 32 which is relatively narrow and faces toward the interior of the central flow passage of the pipes ends 10, 12. The groove 30 also includes a radially outer second axially wider portion 34 which is circumferentially continuous about the flanges 16, 18. The gasket member 54 is shaped and configured so as to have a relatively narrow inner portion 56 that is sized and shaped so as to be suitably compressed in the first inner portion 32 of groove 30 in a manner so as to generate suitable sealing pressures and be compressed such that the inner face 58 of gasket 54 forms a smooth continuation with the inner walls of the pipe ends 10, 12 in the manner shown. The radial outer portion of gasket 54 is of significantly wider dimension in the axial direction and configured and shaped so as to be received and located within the wider outer portion 34 of groove 30. The outer portion 59 of gasket 54 is sized and located to act to center the gasket in the groove 30 while leaving significant expansion space 60 radially outward of the gasket. Preferably, portion 58 is sized and configured so that when it is placed in position in one of the gasket end faces, it will grip the groove and hold it in place while the other pipe end is brought into aligned position during make up.

In the FIG. 3 embodiment, as was previously discussed with respect to the FIG. 1 embodiment, it is, of course, possible to incline the inner faces of the flanges so that the first inner portion 32 of the opening 30 taper in an inward direction to somewhat control the direction of expansion which is expected to take place with temperature cycling.

Figure 4:
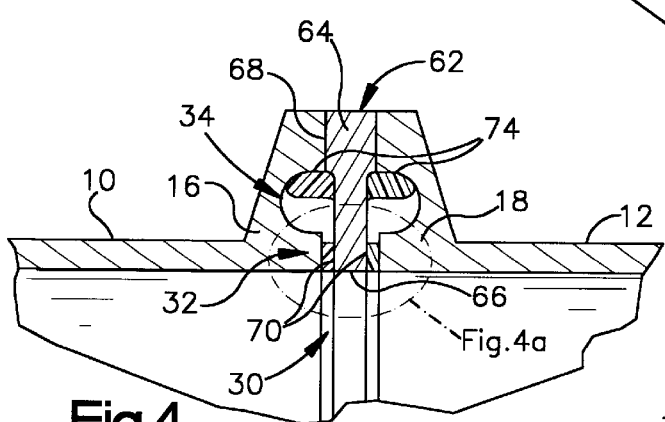

The FIG. 4 showing provides an alternate embodiment for the gasket assembly which can generally achieve the same results as the FIGS. 1 and 2 embodiment. In the FIG. 4 showing, the pipe ends 10, 12 are provided with flanges 16 and 18 that are generally identical to those described with respect to FIG. 1. In the FIG. 4 showing, however, the gasket assembly is a metal and elastomer combination identified with the numeral 62. In particular, the gasket 62 comprises a central annular metal ring member 64 which has an inner periphery 66 that corresponds to the inner diameter of the pipe ends 10 and 12. The thickness of the outer peripheral portion 68 is selected so as to limit the total axial compression that can be applied to the associated elastomer components of the gaskets. In the subject embodiment, the outer peripheral portion 68 is thicker than the inner peripheral portion which carries the elastomer elements.

As can be seen, the FIG. 4 embodiment has a first pair of elastomer elements 70 and have a generally rectangular shape as shown. The positioning and sizing of portions 70 is such that when the joint is made up and the flanges engage the portion 68 of ring 66, the proper sealing compression is applied to the portions 70 and they are compressed radially inward to a position to provide a smooth continuation between the inner surfaces of the pipe ends 10, 12 and the inner peripheral surface of ring 64.

Locating of the gasket 62 relative to the flanges 16, 18 is accomplished by a pair of elastomeric sections 74 that are sized and arranged to resiliently engage within the recesses of the axially wider portion 34 of the packing receiving opening 30. It is preferred that the elastomeric portions 74 be aligned such they can retain the gasket in engagement with the flanges by resiliently gripping therein during assembly.

As can be seen in the FIG. 4 embodiment, there results a large amount of open space or expansion space behind the elastomeric portions 70 so that there is space into which the elastomer can expand during, or as a result of, temperature cycling.

Figure 4A:
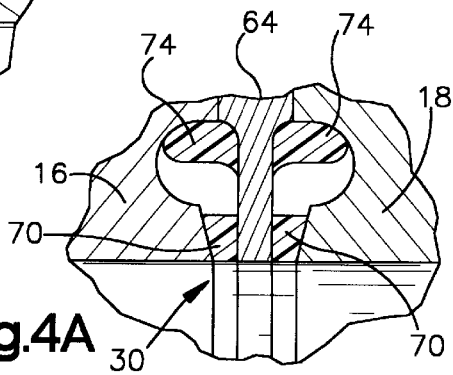

FIG. 4a shows a slightly modified version of the FIG. 4 embodiment wherein the flange face portions which define the narrower portion of the gasket groove are inclined slightly to attempt to direct expansion, should it take place, in a radial outward direction.

Figure 5:
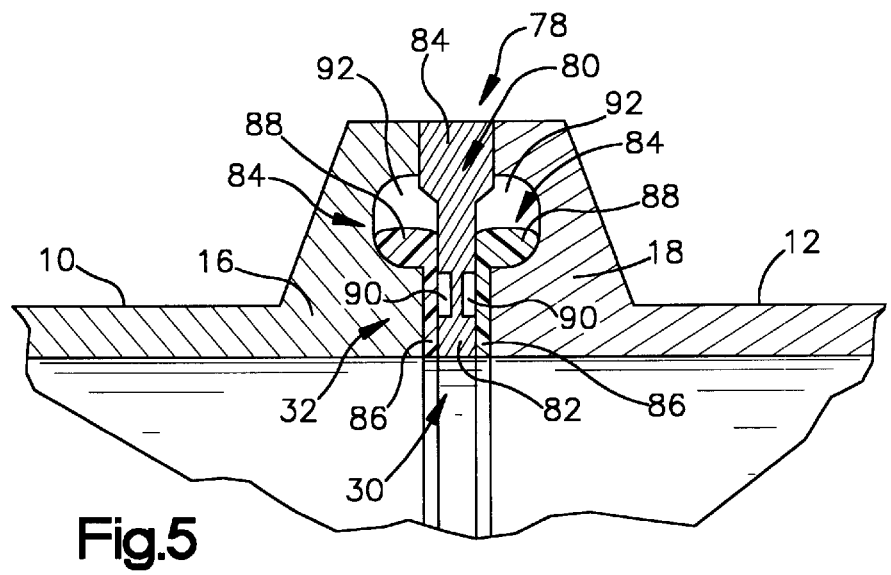

FIG. 5 represents a further possible embodiment of the invention. In the FIG. 5 showing, the pipe ends 10, 12 and the respective gaskets 16, 18 are as previously described with reference to FIGS. 1 and 3 embodiments. The gasket 78, however, varies from that previously discussed in certain particulars. To begin with, the gasket 78 uses a central metal ring 80 that is sized so that its inner periphery 82 corresponds in diameter to the inner diameter of the pipe ends 10, 12. The elastomeric members bonded to opposite sides of ring 82 include the narrower radial inner portions 86 and enlarged radial outer portions 88. The inner portions 86 are relatively thin in the axial direction and sized so that upon make up to the position in FIG. 5, the proper sealing pressure is generated between the flange faces and the seal portions 86. In addition, the sizing is such that when in the made up condition, the radial inner edges of elastomeric portions 86 are substantially exactly in alignment with the inner face 82 and the interior wall surfaces of the pipe ends 10, 12.

In the FIG. 5 embodiment, the expansion space necessary to relieve the tendency of the elastomer seal portions 86 to enter into the pipe bore is achieved by grooves 90 formed about the ring. This provides a first expansion area. The radially outer elastomeric portions 88 are also preferably configured so as to grip the larger recesses provided by the wider radial outer portion 34 of the groove 30. They are not, however, sufficiently large to totally enclose the area thus leaving additional open expansion areas 92.

Figure 6:
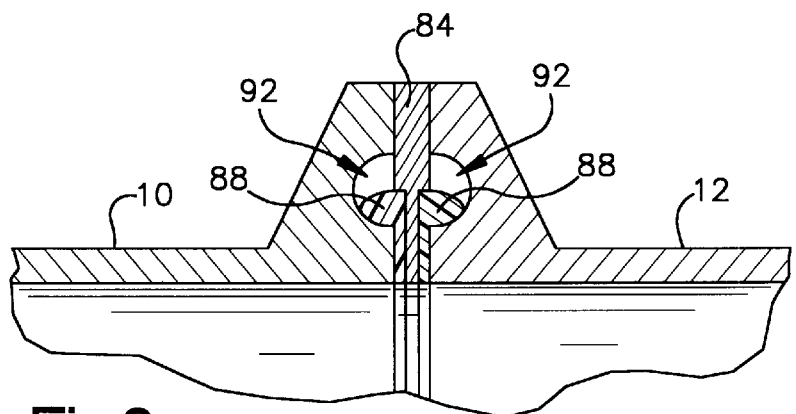

The FIG. 6 embodiment is closely similar to that described with reference to FIG. 5. However, in the FIG. 6 embodiment, the expansion spaces or grooves 90 are eliminated and reliance is placed entirely on the expansion spaces 92. As previously mentioned, however, it is possible to incline the opposite faces of the ring and/or the opposed faces of the flange to induce a radial outer direction to the expansion.

Figure 7:
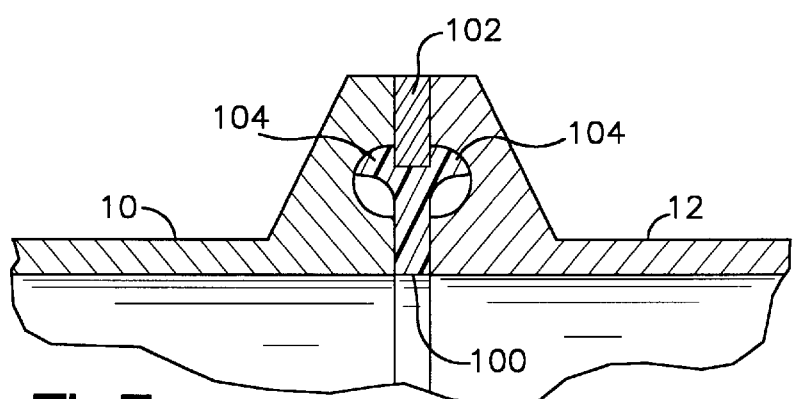

FIG. 7 is a further embodiment which can possibly be used to achieve the desired results. In this embodiment, the elastomeric ring material 100 is bonded to a metal ring 102 which is sized only to engage the radial outer portions of the flanges in the manner shown. The elastomeric portions are, however, sized so that upon make-up the radial inner portions of the elastomeric material exactly correspond to the inner diameters of the pipe ends 10, 12. An outwardly flared portion 104 of the elastomer is, however, positioned to allow the flange to be held in place on either of the flanges during make up.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A pipe joint assembly for joining a pair of cylindrical pipe or tube ends in a axially contiguous relationship, said pipe ends having cylindrical interior surfaces of the same diameter in an aligned relationship, the assembly comprising:

a pair of connecting flanges extending radially outward of each of said pipe ends, said connecting flanges having opposed faces defining a circumferentially continuous packing groove including a first axially narrow portion opening to the cylindrical interior surfaces and a second axially wider portion radially outward of the first portion;

rigid means associated with the flanges to limit movement of the flange faces axially toward one another;

a polymeric gasket positioned in the packing groove, said gasket sized and dimensioned to completely fill the first axially narrow portion and extend to within the second portion, the radial inner extent of the gasket providing a smooth continuation of the cylindrical interior surfaces of said pipe ends when the flange faces are at their limit of movement toward one another;

the second portion of the packing groove being sufficiently large to provide expansion space into which the gasket can expand when subjected to temperature increases to thereby reduce extrusion of the gasket beyond the cylindrical interior surfaces of said pipe ends; and said expansion space being symmetrically located about said gasket.

2. A pipe joint assembly as defined in claim 1 wherein the rigid means include rigid extensions on the radial outer edge of the opposed faces of the connecting flanges.

3. A pipe joint assembly as defined in claim 1 wherein the rigid means includes at least one metal insert carried by the gasket and extending radially outward between the opposed faces of the connecting flanges.

4. A pipe joint assembly as defined in claim 1 wherein the first axially narrow portion of the packing groove is defined by axially spaced and radially extending sections of the opposed faces of the connecting flanges, said axially spaced and radially extending sections being substantially planar.

5. A pipe joint assembly as defined in claim 4 wherein said axially spaced and radially extending sections of the opposed faces are parallel.

6. A pipe joint assembly as defined in claim 4 wherein said axially spaced and radially extending sections of the opposed faces of the connecting flanges are more widely spaced adjacent the second axially wide portion of the packing groove than they are adjacent the cylindrical interior surfaces of the pipe ends.

7. The assembly of claim 1 wherein said gasket has an inner diameter equal to or less than the second portion of the groove whereby an interference fit occurs.

8. The assembly of claim 1 wherein the expansion space is at least 18% of the minimum volume of the seal.

9. The assembly of claim 1 wherein the groove has a generally T shaped cross section.

10. The assembly of claim 1 wherein the narrow inner portion of said gasket is axially compressed about 25%, and the wider out portion of said gasket is axially compressed about 18%.

11. The assembly of claim 3, wherein said opposed flange faces of said first axially narrow portion of said groove are inwardly tapered in a axial direction toward the interior of the flanges, whereby the direction of expansion of the gasket is controlled.

12. The assembly of claim 1, wherein said gasket has a first portion for reception into said narrow portion of said groove, and a second portion of said gasket being axially wider than said first portion, and said second portion of said gasket being received in said wider portion of said groove.

13. The assembly of claim 1 wherein said gasket comprises a central annular metal ring having an inner periphery for reception into said narrow portion of said groove; a first pair of elastomer elements affixed on the outer sides of said ring on said inner periphery for reception in said narrow portion of said groove, and a second pair of elastomeric elements affixed on the outer side of said ring on said outer periphery for reception into said wider portion of said groove; and the rigid means comprising the outer peripheral portion of said metal ring of the gasket and extending radially outward between the opposed faces of the connecting flanges.

14. The assembly of claim 13 wherein said metal ring comprises an expansion groove whereby the gasket can expand into the groove.

15. The assembly of claim 1 wherein said gasket is comprised of an elastomeric material.

16. The assembly of claim 1 wherein said gasket is comprised of tetrafluorethylene.

17. A pipe joint assembly for joining a pair of cylindrical pipe or tube ends in a axially contiguous relationship, said pipe ends having cylindrical interior surfaces of the same diameter in an aligned relationship, the assembly comprising:

a pair of connecting flanges extending radially outward of each of said pipe ends, said connecting flanges having opposed faces defining a circumferentially continuous packing groove including a first axially narrow portion opening to the cylindrical interior surfaces and a second axially wider portion radially outward of the first portion;

rigid means associated with the flanges to limit movement of the flange faces axially toward one another;

a polymeric gasket positioned in the packing groove, said gasket sized and dimensioned to completely fill the first axially narrow portion and extend to within the second portion, the radial inner extent of the gasket providing a smooth continuation of the cylindrical interior surfaces of said pipe ends when the flange faces are at their limit of movement toward one another;

the second portion of the packing groove being sufficiently large to provide one or more expansion spaces into which the gasket can expand when subjected to temperature increases; and said opposed flange faces of said first axially narrow portion of said groove are inwardly tapered in an axial direction toward the interior of the flanges, whereby the direction of expansion of the gasket is controlled.

18. A pipe joint assembly for joining a pair of cylindrical pipe or tube ends in a axially contiguous relationship, said pipe ends having cylindrical interior surfaces of the same diameter in an aligned relationship, the assembly comprising:

a pair of connecting flanges extending radially outward of each of said pipe ends, said connecting flanges having opposed faces defining a circumferentially continuous packing groove including a first axially narrow portion opening to the cylindrical interior surfaces and a second axially wider portion radially outward of the first portion;

rigid means associated with the flanges to limit movement of the flange faces axially toward one another;

an elastomeric gasket positioned in the packing groove, said gasket sized and dimensioned to completely fill the first axially narrow portion and extend to within the second portion, the radial inner extent of the gasket providing a smooth continuation of the cylindrical interior surfaces of said pipe ends when the flange faces are at their limit of movement toward one another; and the second portion of the packing groove providing two or more expansion spaces into which the gasket expands when subjected to an increase in temperature, said expansion spaces being sized and positioned to substantially prevent extrusion of the gasket beyond the cylindrical interior surfaces of said pipe ends, with said radial inner extent of the gasket maintaining a smooth continuation with the cylindrical interior surfaces of said pipe ends.

19. The assembly of claim 1 wherein said gasket comprises one or more expansion spaces.

20. The assembly of claim 1 wherein said gasket positioned within said narrow portion of said groove comprises one or more expansion spaces.

\* \* \* \* \*